United States Patent
Xu et al.

(10) Patent No.: US 10,692,245 B2
(45) Date of Patent: Jun. 23, 2020

(54) COLOR IDENTIFICATION IN IMAGES

(71) Applicant: Datacolor Inc., Lawrenceville, NJ (US)

(72) Inventors: Zhiling Xu, West Windsor, NJ (US); Taeyoung Park, Princeton, NJ (US)

(73) Assignee: DATACOLOR INC., Lawrenceville, NJ (US)

(*) Notice: Subject to any disclaimer, the term of this patent is extended or adjusted under 35 U.S.C. 154(b) by 86 days.

(21) Appl. No.: 16/022,322

(22) Filed: Jun. 28, 2018

(65) Prior Publication Data

US 2019/0019313 A1 Jan. 17, 2019

Related U.S. Application Data (60) Provisional application No. 62/531,015, filed on Jul. 11, 2017.

(51) Int. Cl.
*G06K 9/00* (2006.01)
*G06T 7/90* (2017.01)

(52) U.S. Cl.
CPC ...... *G06T 7/90* (2017.01); *G06T 2207/10024* (2013.01)

(58) Field of Classification Search
CPC . G06T 7/90; G06T 2207/10024; G06T 11/00; G06T 7/50; G06F 3/0481; G06F 16/5838; G06K 9/00; G06K 9/46; G06K 9/4642; H04N 1/60; H04N 9/735; H04N 9/643; H04N 9/646; H04N 17/002; H04N 17/02; G01J 1/42; G01J 3/52; G01N 33/487

USPC .............. 382/103, 167, 128, 162; 348/223.1
See application file for complete search history.

(56) References Cited

U.S. PATENT DOCUMENTS

| | | | | |
|---|---|---|---|---|
| 5,546,195 A | * | 8/1996 | Arai | H04N 1/6088 358/518 |
| 5,766,738 A | * | 6/1998 | Phillips | B05D 1/286 428/200 |
| 7,180,629 B1 | * | 2/2007 | Nishio | H04N 9/735 348/223.1 |
| 8,055,067 B2 | * | 11/2011 | Petrescu | G06K 9/00 382/115 |
| 8,156,132 B1 | * | 4/2012 | Kaminski, Jr. | G06F 16/5838 707/758 |
| 8,549,022 B1 | * | 10/2013 | Kaminski, Jr. | G06F 16/43 707/758 |
| 8,634,640 B2 | * | 1/2014 | Bhatti | G01J 3/462 382/167 |

(Continued)

*Primary Examiner* — Mahendra R Patel
(74) *Attorney, Agent, or Firm* — Leason Ellis LLP (57) ABSTRACT

A method is provided for identifying colors across illuminants using a processor configured by code executing therein, the method comprising capturing a sample image with an image recording device, the image including pixels representing a color sample under analysis and a color reference chart. The processor is also configured to execute comparing the color values of pixels representing the color reference chart of the sample image to the pixel values corresponding to a plurality of entries within a plurality of color reference datasets to determine the dataset representing the closest match of the illumination present at the time the sample image was captured. Using the identified illuminant, the color reference dataset having the closest illuminant is searched for the color under analysis.

18 Claims, 6 Drawing Sheets

(56) References Cited

U.S. PATENT DOCUMENTS

| | | | | |
|---|---|---|---|---|
| 8,655,068 B1* | 2/2014 | Li | .......................... | H04N 1/60 382/128 |
| 2003/0164927 A1* | 9/2003 | Tsukada | ............. | H04N 5/44513 353/31 |
| 2004/0101195 A1* | 5/2004 | Akaishi | ................... | H04N 1/58 382/162 |
| 2004/0257377 A1* | 12/2004 | Ruark | .................. | G06T 11/001 345/589 |
| 2005/0275912 A1* | 12/2005 | Chen | ....................... | G09G 5/02 358/523 |
| 2006/0280360 A1* | 12/2006 | Holub | ...................... | G01J 3/02 382/162 |
| 2007/0035554 A1* | 2/2007 | McClanahan | ........... | G01J 3/463 345/589 |
| 2008/0137941 A1* | 6/2008 | Tin | ........................ | G06K 9/209 382/162 |
| 2013/0308852 A1* | 11/2013 | Hamsici | ................... | G01J 3/46 382/159 |
| 2013/0342557 A1* | 12/2013 | Finlayson | ................ | H04N 1/60 345/589 |
| 2014/0022410 A1* | 1/2014 | Gish | ........................ | H04N 1/60 348/223.1 |
| 2014/0093122 A1* | 4/2014 | Rabinowitz | ........... | G06T 1/0021 382/100 |
| 2016/0223146 A1* | 8/2016 | Vick | ....................... | F21K 9/64 |
| 2016/0350900 A1* | 12/2016 | Barron | .................... | G06T 5/40 |
| 2017/0116754 A1* | 4/2017 | Imber | ...................... | G06T 7/90 |
| 2017/0131147 A1* | 5/2017 | Yu | .......................... | G01J 3/462 |
| 2017/0154425 A1* | 6/2017 | Pierce | ................... | G06K 9/4671 |
| 2017/0237971 A1* | 8/2017 | Pitts | ................... | H04N 13/232 345/419 |
| 2018/0089532 A1* | 3/2018 | Xu | ...................... | G06K 9/4652 |
| 2019/0114747 A1* | 4/2019 | Treibitz | ............. | G06F 16/9027 |

* cited by examiner

COLOR IDENTIFICATION IN IMAGES

CROSS REFERENCE TO RELATED APPLICATION

The present application claims the benefit of U.S. patent application Ser. No. 62/531,015, filed Jul. 11, 2017, which is hereby incorporated by reference in its entirety.

FIELD OF THE INVENTION

The present invention is directed to systems and methods for identifying unknown colors present in a sample image under an unknown light by identifying from a collection of known reference-color chart images having the closest match to the sample image and then matching the unknown color to the colors in the matched reference-color chart.

BACKGROUND OF THE INVENTION

There is often a need to capture the color of a sample and determine the closest match for the color of that sample from an existing database. For example, a user may want to find out the paint color of a wall or piece of furniture. To do so, they might search through the paint manufacturer's fan deck to identify the color. As an alternative to a tedious manual search, a colorimeter or a spectrophotometer can be used to identify a color of interest. Such devices are both expensive and inconvenient to use. Furthermore, a user is unlikely to bring such a specialty devices on trips, tours, scouting events or excursions.

Efforts have been made to use images taken with a camera to select color from a database. For example, U.S. Pat. No. 8,634,640 to Nina Bhatti et. al. (herein incorporated by reference as if presented in its entirety) teaches a method to select a color palette from a camera image, aided with a reference color chart. In that method, matrix transformations are used to convert images taken with an unknown illuminant to known illuminant, and thus eliminate the need of controlled illumination. However, since matrix transformations are linear operations, the method taught by Bhatti has strict requirements for the hardware used by the system. Additionally, the system taught by Bhatti is sensitive to noise, resulting in diminished performance under a wide range of operational conditions.

Thus, what is needed is a more robust solution that permits the accurate determination of color values across a wide range of operation and lighting conditions. Indeed, it will be helpful to have a system and method that utilizes available cameras such as those in smartphones, to acquire an image and use the data captured in the image to identify a color reference pattern taken under similar illumination. Furthermore, what is needed in the art are systems, methods and computer program products for evaluating color values of an image and searching for the same or similar colors in a collection of colors offered by various color vendors.

SUMMARY OF THE INVENTION

In one or more implementations described herein, a method is provided for identifying colors across illuminants using a processor configured by code executing therein, the method comprising capturing a sample image with an image recording device, the image including pixels representing a color sample under analysis and a color reference chart. The method further includes accessing, using the processor, a plurality of datasets, where each one of the plurality of datasets includes one or more entries, each entry containing a reference to a name of a known color sample, the color values of the known color sample and the color values of a color reference chart obtained with the sample color values under a known illuminant.

The processor is also configured to execute comparing the color values of pixels representing the color reference chart of the sample image to the pixel values corresponding to the color reference chart in each entry of each of the plurality of color datasets. The method includes identifying the color dataset having the smallest difference in color values between the color reference chart provided in the sample image and the color values of the color reference chart provided in the one or more entries of the one or more datasets and comparing the color values of the pixels representing the color sample of the sample image to the color sample of each entry in the identified color dataset. Furthermore, the method includes identifying an entry of the identified color dataset having the smallest difference in color values between the color sample of the sample image and outputting the name of the identified color sample.

A system is also described herein that includes a camera configured to capture an image of an unknown sample color along with a reference color chart under an unknown illuminant, and one or more processors configured to search existing database(s) of reference-color charts to find the closest matching copy of the reference-color chart acquired under different known illuminants, identify the unknown illuminant as the one so selected, and then find the color in an illuminant-indexed database that is closest to the unknown color. Included in the database are camera readings of each known color in the database along with the known reference color chart. Various databases of the same group of colors under different illuminants have built. When searching a close match of an unknown color from the databases, the reference color chart is first used to identify the illuminant from various databases, and within the proper database, the unknown color can be further identified by searching for the closest color match in the closest known illuminant color database.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

By way of overview and introduction, various embodiments of the systems and methods described herein are directed towards color searching, identification, and analysis. Similar cameras, such as a particular make or model of camera or imaging device incorporated into smart devices (telephones, tablets, etc.), can be used to capture images of a color sample. Under known illuminants, colors obtained with one device can easily be matched to colors obtained with a similar device. However, where the illumination differs between image captures, matching the captured color to a known reference color becomes difficult.

In order to allow for multiple devices to identify sample colors obtained from images taken under different illuminants, the systems and methods described herein obtain from a camera or other imaging device an image of a sample color and a reference color chart. Using this single image, an existing collection of databases are searched to identify a color value having the closest match to the color values obtained in the image. Furthermore, each of the databases represents a collection of colors obtained under a different illuminant.

The systems and methods described herein present novel and unconventional approaches to the identification of color values under different illuminants. For example, by using a consistent make and model of commercially available image sensor, collections of color data taken under a particular illuminant can be queried to determine the closest illuminant to the illuminant under which a particular image was taken. Using this information, a more robust and superior measurement can be obtained relative to the currently available approaches.

Figures 1A, 1B:
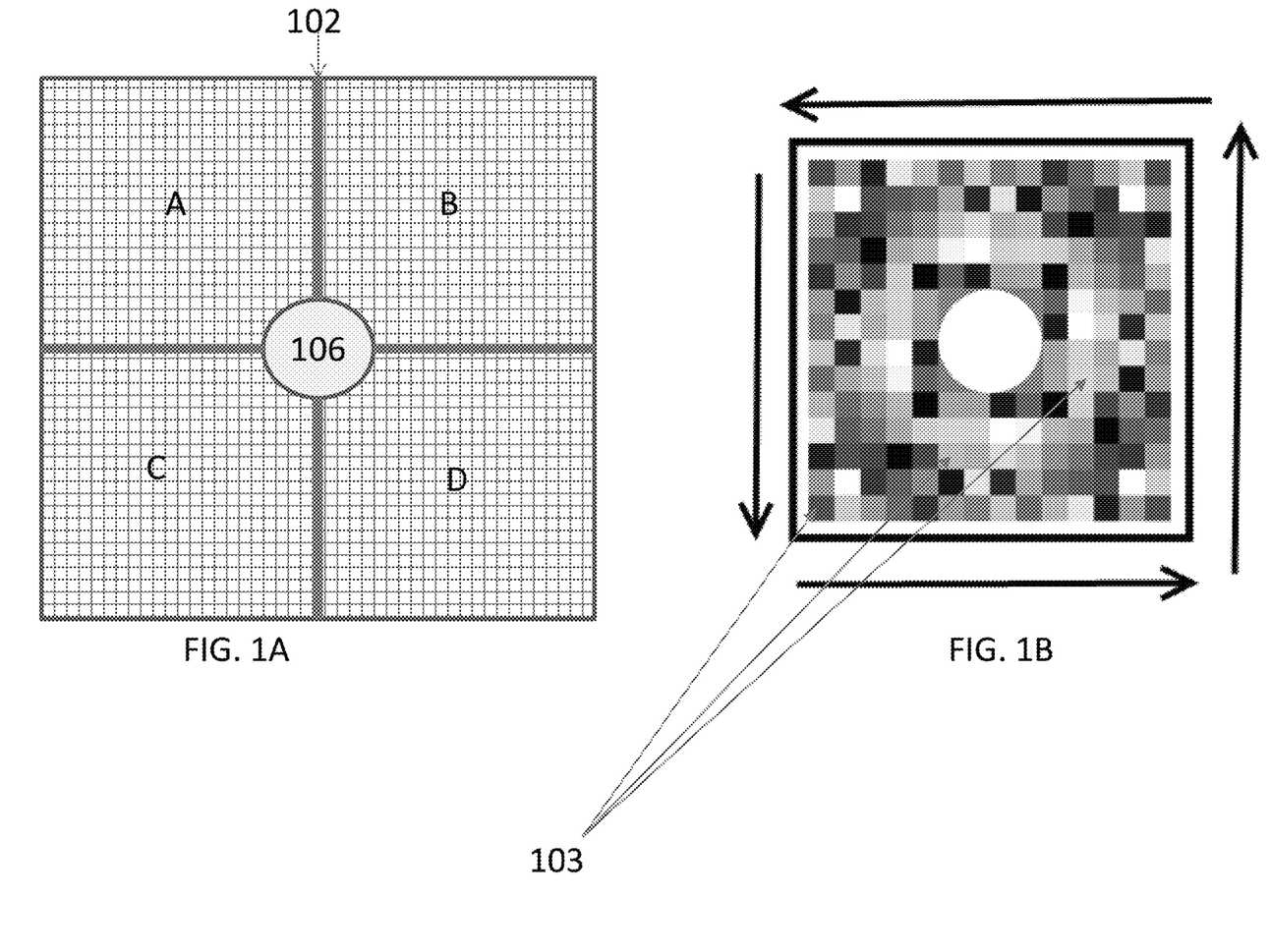
FIG. 1A illustrates the color reference chart according to one embodiment of the present invention.
FIG. 1B illustrates an alternative view of the color reference chart according to one embodiment of the present invention.
Figure 1C:
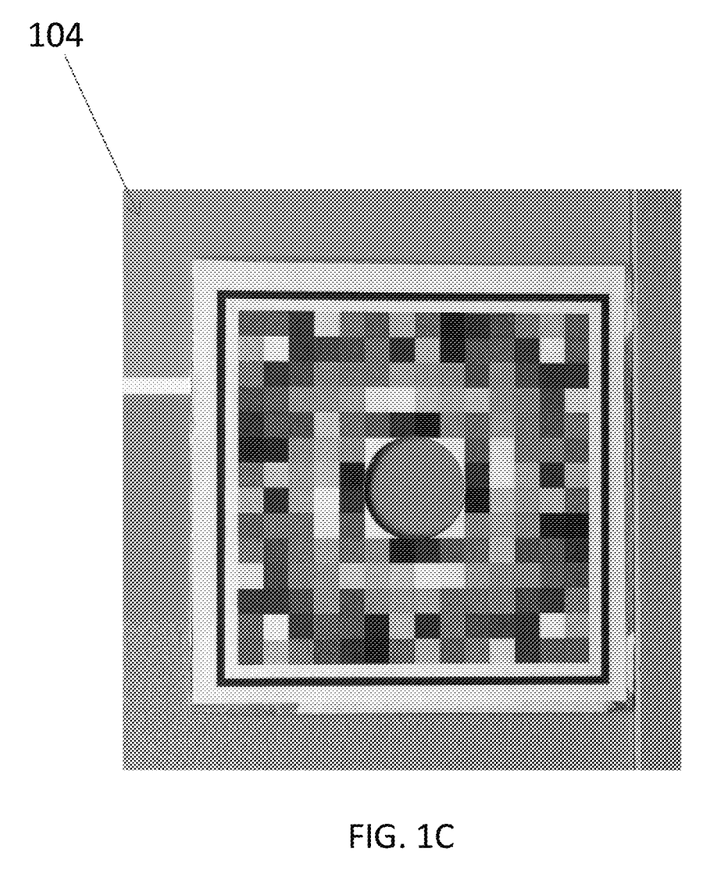
FIG. 1C illustrates an alternative view of the color reference chart according to one embodiment of the present invention.
Figure 2:
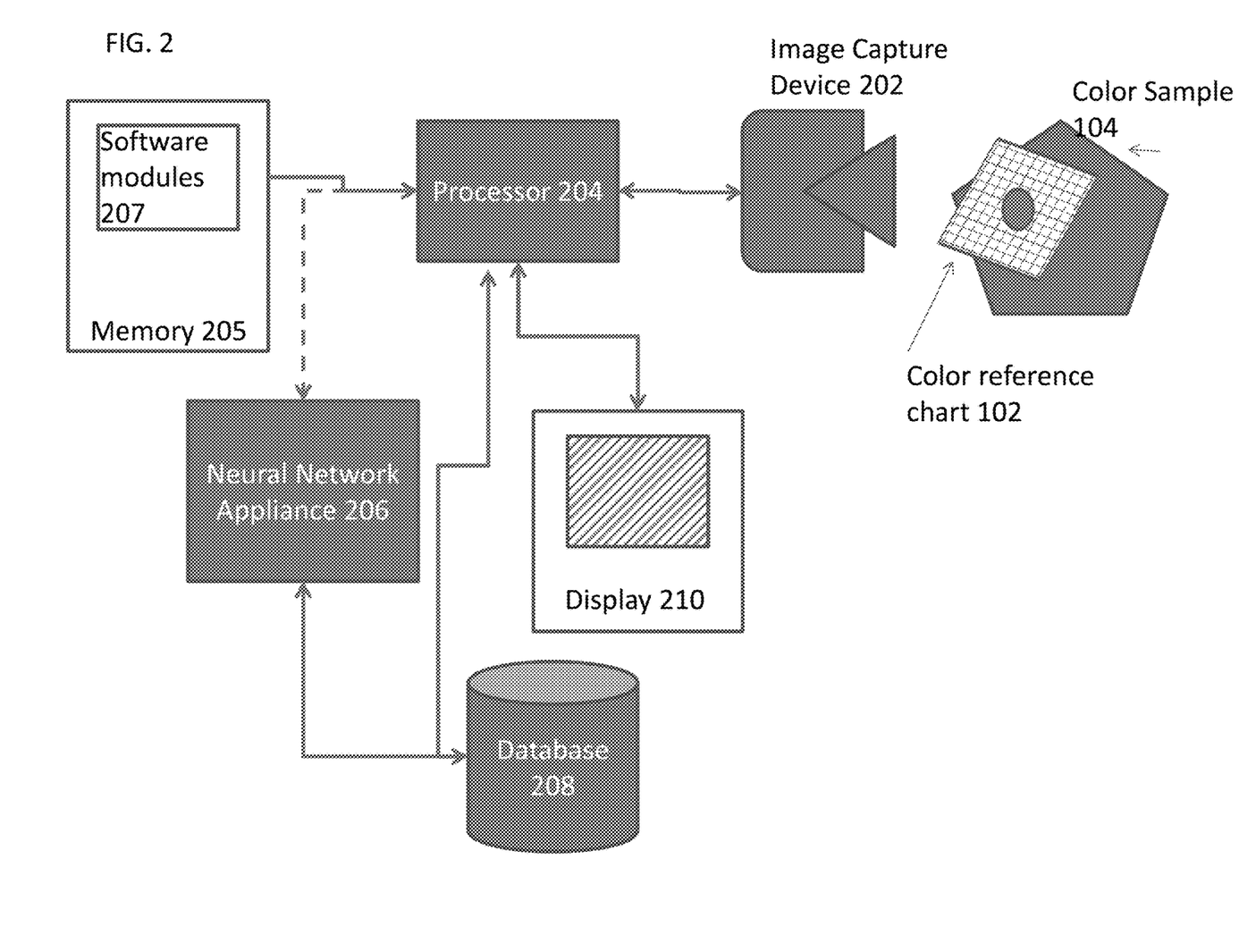
FIG. 2 illustrates a block diagram of a color search process according to one embodiment of the present invention.

As shown in FIGS. 1C and 2, the color sample 104 to be captured in an image is any physical article having color or spectral properties in need of analysis. In one particular implementation, the color sample 104 is a wall. In another implementation, the color sample 104 is a piece of furniture. In yet a further implementation, the color sample 104 is an object or item. In still another implementation, the color sample 104 is a fabric sample such as fleece or fabric blends. In yet another particular implementation, the color sample 104 is any material that has color properties desirable for analysis. For example, the color sample 104 is a section or portion of stucco, carpe, building materials, housing, chassis, packaging, or other item.

As provided in FIGS. 1A-B, a color reference chart 102 is used to bracket the unknown color sample 104 with a collection of known color values. As shown in FIGS. 1A-B, the color reference chart 102 includes a plurality of discrete color reference elements 103 or reflectance samples. Here, the color reference chart 102 is divided into four (4) quadrants about a center portion 106, referenced A, B, C, and D. In one or more configurations, the center portion 106 is an aperture or transparent window permitting the observation of a portion of a color sample 104 when the color reference chart 102 is placed in-between an image capture device 202 and the color sample 104, as shown in FIG. 1C. Alternatively, the center portion 106 of the color reference chart 102 is a stage or platform suitable for the placement of a sample 104 under analysis.

In one particular implementation, the color reference chart 102 includes four (4) quadrants. Each quadrant contains the same number of reflectance samples. In a particular arrangement, the quadrants are arranged to be four-fold rotationally symmetric about the center portion 106. In the described arrangement, each reflectance element found within a given quadrant will have counterparts in the other quadrants. Thus, while the possible number of element groups (here referred to as quadrants) are based on particular design constraints (e.g. fourfold symmetry or threefold symmetry), the number of reflectance elements within each group will always be the same. Furthermore, each member of a group of color reflectance elements has counterpart reflectance elements in each of the remaining color reference groups. It should be noted that while each counterpart color element will have approximately the same wavelength-dependent reflectance value, variations in production of reflectance elements means that each counterpart reflectance sample will have some deviations from the known or "true" wavelength-dependent reflectance value for that reflectance element.

A color reference chart 102 having four-fold symmetry, such as provided in FIGS. 1A-1B, presents an effective way to ensure that each section of the color reference chart has the same number of elements 103 and that the shape of the color elements 103 can be easily tiled into the area occupied by that group without overlap or empty space. Furthermore, fourfold rotational symmetry allows the counterpart reflectance elements to be at four positions under potentially spatially non-uniform illumination. Thus, by averaging the camera values determined for a reflectance element and its matching counterparts, a RGB color value can be estimated that is representative of the camera values obtained if the reflectance element had been in the center portion 106.

Those possessing an ordinary level of requisite skill in the art will appreciate that other configurations, such as the reference elements having threefold symmetry about the sample, can be used in accordance aims described herein.

With reference to FIG. 1B, quadrants A-D each are rotated 90 degrees relative to the neighboring quadrants. For example, Quadrant C represents a 90-degree counter-clockwise rotation of each element within the quadrant using the center of the reference chart as the pivot point. As shown in particular detail and described herein, each corner element of the color reference chart 102 is an identical color. Due to four-fold rotational symmetry, the color directly below the corner element in Quadrant A, is the same color as the element directly to the right of the corner element in Quadrant C.

In one particular embodiment, the provided color reference chart includes 45 color reference elements. Thus, where there are four quadrants, the color reference chart provides at least 180 color references for use in connection with the color searching and analysis system and methods described herein. Those possessing an ordinary level or skill in the requisite art will appreciate that other groups and numbers of colors are also possible and envisioned.

With general reference to FIG. 2, the sample 104 is placed so that an image of the sample is captured by an image capture device 202. In one particular implementation, the image capture device 202 is a scientific CMOS (Complementary Metal Oxide Semiconductor), CCD (charge coupled device) or other image acquisition device and associated hardware, firmware and software. Furthermore, the image capture device 202 is configured to store or transmit recorded images as a collection of representative pixel points, data sets, binary streams, bit strings, pixel arrays, file or collection of files or other suitable formats for the evaluation of the data or processes described herein. As used throughout, the images captured by the image capture device 202 include spectral information, RGB information, or other multi-wavelength data representative of light reflected off of the sample. In a particular implementation, the image capture device 202 includes one or more light sources configurable to emit light at a pre-determined wavelength or across a range of wavelengths. Additionally, the image capture device 202 includes one or more selectable filters. For example, one or more polarizing or wavelength filters may be selectively engaged or positioned relative to an image capture sensor of the image capture device 202.

In an alternative arrangement, the image capture device 202 is one or more hyperspectral sensors or cameras. For example, the image capture device 202 is a hyperspectral camera device configured to collect information as a set or collection of representations of a pre-determined wavelength range of the electromagnetic spectrum, or spectral band. As used herein, such hyperspectral camera devices are configured to output a three-dimensional (x, y, λ) hyperspectral data cube for processing and analysis, where x and y represent two spatial dimensions of the captured scene, and λ represents the spectral dimension (comprising a range of wavelengths).

The image capture device 202, in accordance with one embodiment, is a stand-alone device capable of storing local copies of images within an integrated or removable memory. In an alternative implementation, the image capture device is configured to transmit one or more captured images to a remote storage device or processing platform, such as processor 204. In configurations calling for remote storage of image data, the image capture device 202 is equipped or configured with network interfaces or protocols usable to communicate over a network, such as the Internet.

Alternatively, the image capture device 202 is connected to one or more computers or processors, such as processor 204, using standard interfaces such as USB, FIREWIRE, Wi-Fi, Bluetooth, and other wired or wireless communication technologies suitable for the transmission image data.

In a further implementation, the image capture device 202 is a camera or image recording device integrated into a smartphone, tablet, cell phone, or other portable computing apparatus. In a further embodiment, the image capture device 202 is an "off the shelf" digital camera or webcamera connected or in communication with one or more computing devices.

The image obtained by the image capture device 202 is transmitted to one or more color processor(s) 204 for evaluation. The color processor 204 is configured through one or more software modules to separate or extract color values for one or more given pixels within the image for further analysis. With further reference to FIG. 2, the processor 204 is a commercially available computing device. For example, the color processor 204 may be a collection of computers, servers, processors, cloud-based computing elements, micro-computing elements, computer-on-chip(s), home entertainment consoles, media players, set-top boxes, prototyping devices or "hobby" computing elements.

Furthermore, the color processor 204 can comprise a single processor, multiple discrete processors, a multi-core processor, or other type of processor(s) known to those of skill in the art, depending on the particular embodiment. In a particular example, the color processor 204 executes software code on the hardware of a custom or commercially available cellphone, smartphone, notebook, workstation or desktop computer configured to receive images captured by the image capture device 202 either directly, or through a communication linkage.

The color processor 204 is configured to execute a commercially available or custom operating system, e.g., MICROSOFT WINDOWS, APPLE OSX, UNIX or Linux based operating system in order to carry out instructions or code.

In one or more implementations, the color processor 204 is further configured to access various peripheral devices and network interfaces. For instance, the color processor 204 is configured to communicate over the internet with one or more remote servers, computers, peripherals or other hardware using standard or custom communication protocols and settings (e.g., TCP/IP, etc.).

The color processor 204 may include one or more memory storage devices (memories). The memory is a persistent or non-persistent storage device (such as an IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the color processor 204 provides for the storage of application program and data files. One or more memories provide program code that the color processor 204 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the color processor 204 provides for storage of an application program and data files when needed.

The color processor 204 is configured to store data either locally in one or more memory devices. Alternatively, the color processor 204 is configured to store data, such as image data or processing results, in a local or remotely accessible database 208. The physical structure of the database 208 may be embodied as solid-state memory (e.g., ROM), hard disk drive systems, RAID, disk arrays, storage area networks ("SAN"), network attached storage ("NAS") and/or any other suitable system for storing computer data. In addition, the database 208 may comprise caches, including database caches and/or web caches. Programmatically, the database 208 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 208 includes the necessary hardware and software to enable the color processor 204 to retrieve and store data within the database 208.

In one implementation, each element provided in FIG. 2 is configured to communicate with one another through one or more direct network connections or interfaces, such as a local area network LAN or data cable connection. In an alternative implementation, the image capture device 202, color processor 204, and database 208 are each connected to a network, such as the internet, and are configured to communicate and exchange data using commonly known and understood communication protocols.

In a particular implementation, the color processor 204 is a computer, workstation, thin client or portable computing device such as an Apple iPad/iPhone® or Android® device or other commercially available mobile electronic device configured to receive and output data to or from database 208. Here, the color processor 204 communicates with a display device 210 for displaying data as well as input hardware to permit a user to access information, and to send commands and/or instructions to the color processor 204 and the image capture device. In one or more implementations, the display device 210 is a screen, monitor, display, LED, LCD or OLED panel, augmented or virtual reality interface or an electronic ink-based display device.

Figure 3:
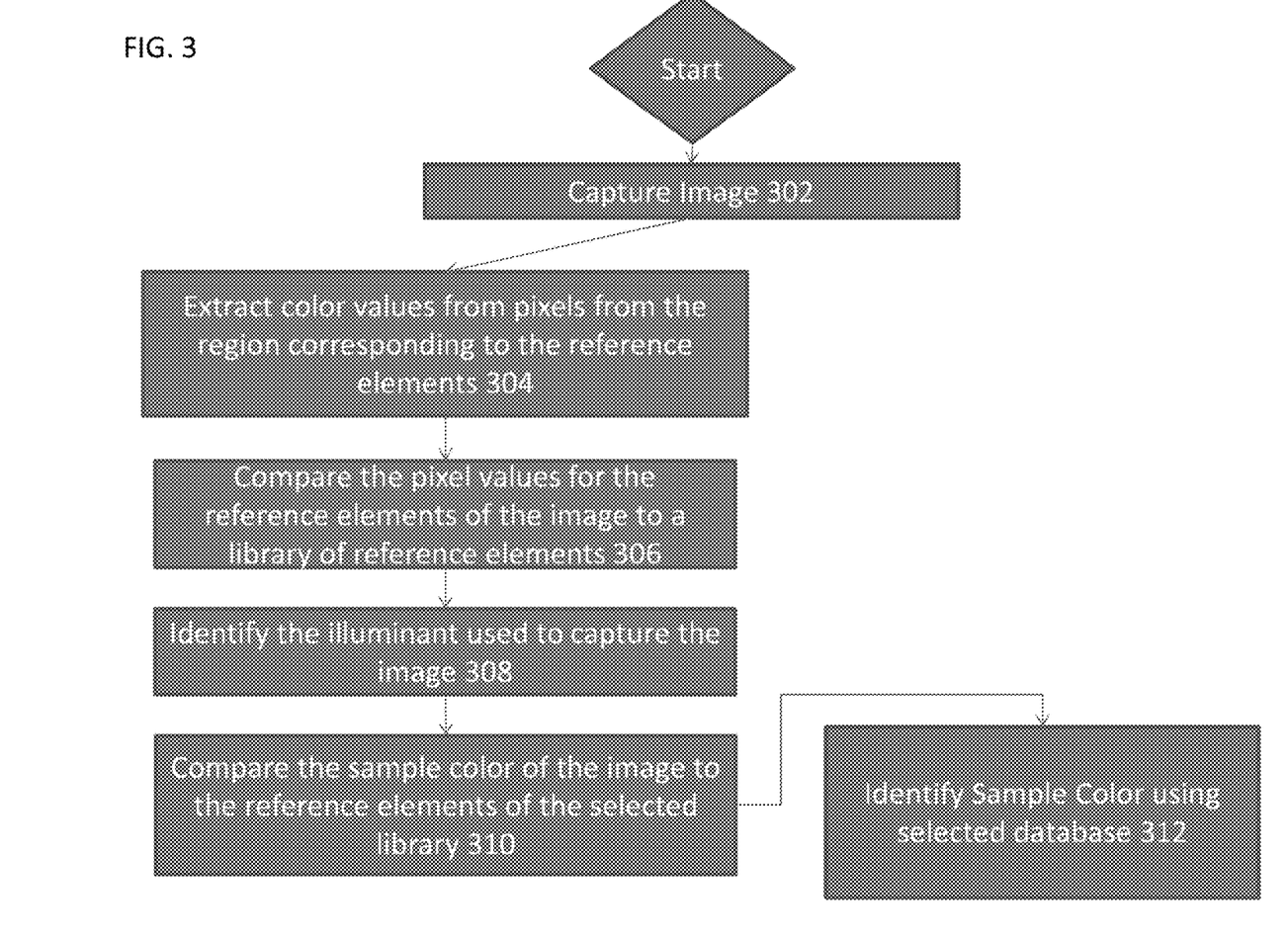
FIG. 3 presents a flow diagram detailing the steps taken in one embodiment of the color searching system according to one embodiment of the present invention.

With particular reference to FIG. 3, in order to acquire an image of the color sample 104 and color reference chart 104, a recording is made of the sample 104 and the color reference chart 102. For example, a recording of the sample 104 and color reference chart 102 is made by capturing an image of the sample 104 and color reference chart 102 using one or more imaging devices 202.

Alternatively, a recording (such as one or more images) of the sample 104 and color reference chart 102 are obtained independently. Here, so long as the illuminant remains unchanged, the two images can be combined using standing photo manipulation techniques to generate a single composite image.

In a further implementation, a video recording is made of the sample 104 and color reference chart 102. In a particular implementation, one or more frames of the video recording is extracted or selected to function as a single image. In a yet further implementation, multiple frames or images are selected from a live or pre-recorded video stream.

In still yet a further implementation, the recording is a composite image formed of several individual or composite images representing at least the sample and the color reference chart. In one or more implementations, the illuminant used to capture the several images is substantially the same. By way of non-limiting implementation, a combined image of the sample 104 and the reference chart 102 is obtained by placing the reference chart over the sample such that the sample color is visible, and both the sample and the reference chart are illuminated by the same illuminant as depicted in FIG. 2.

Figure 4:
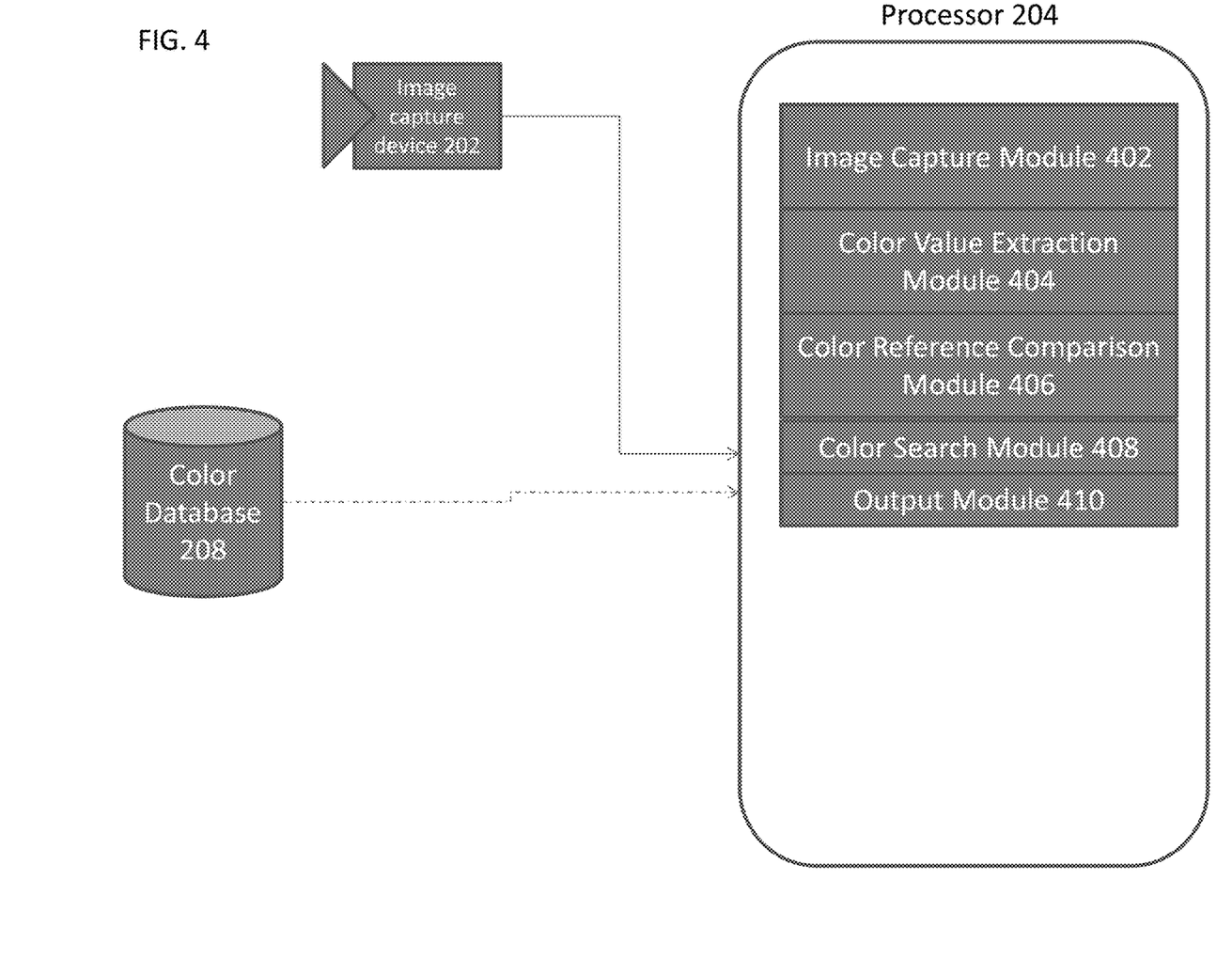
FIG. 4 presents a block diagram detailing specific components of the color searching system according to one embodiment of the present invention.

Turning to FIGS. 3 and 4, a suitably configured processor (e.g. processor 204) captures one or more images of the color sample 104 and color reference 102 as provided in step 302. In a particular implementation, an image capture module 402 configures a processor, computer or computing device (such as mobile computer) to capture or record an image obtained using the image capture device 202. Here, the image captured is composed of a pixel array, where at least some of the pixels represent the image sample and reference chart. In further implementations, the image capture module 402 includes one or more submodules that configure to computer or processor 204 to communicate with the image capture device 202 and cause the image capture device 202 to record or capture the image. In a further implementation, one or more submodules of the image capture module 402 configures the processor 204 to receive a data stream, file, or data object from the image capture device 202. One or more submodules of the image capture module 402 further configures the processor 204 to convert or condition the received image data prior to further processing. For example, a submodule of the image capture module 402 converts the image data from one file type to another prior to further processing the image data.

The computer processor 204 is further configured by one or more submodules of the image capture module 402 to alter one or more light sources illuminating the sample 104. For example, where the image capture device 202 includes a wavelength variable light source, or multiple light sources capable of emitting the same or different wavelengths, the image capture module 302 instructs the image capture device 202 to capture multiple images of the sample under different lighting conditions. In a further implementation, where the image capture device includes one or more selectable filters, the image capture device is configured to apply a filter prior to acquisition of the image of the sample 104.

In one configuration described herein, one or more submodules of the image capture module 402 configures the processor 204 to format, condition or alter the captured image. For instance, the color processor 204 is configured by the image capture module 402 to alter the tone, hue, selection, field of view or other property of the image captured.

In a particular implementation, the image captured by the image capture device 202 is stored within a memory of the color processor 204. Alternatively, the image of the sample 104 is stored on a remote database 208 for later retrieval or processing. In yet a further implementation, the specific make, model, brand, and settings of the image capture device 202 are stored along with the image data. For example, EXIF format data is stored with each recorded image. Where external illumination or light sources are used in conjunction with the image recording device 202, the color processor 204 is configured to obtain and store the relevant illumination data as well.

Turning to step 304, the color values of the pixels representing the reference chart 102 are extracted for further processing. For example, a color value extraction module 404 configures the color processor 204 to extract the RGB color values from pixels representing the reference elements in the captured image. In a further implementation, the color value extraction module 404 configures the color processor 204 to extract the color values for the pixels corresponding to both the color reference chart and the sample. For instance, using one or more image recognition submodules, the color value extraction module 404 identifies the sample by the shape of the aperture 106 of the color reference chart. Using one or more metrics (such as the dimensions of the color reference chart), the color value extraction module 404 extracts color from the pixels corresponding to each color of the color reference chart. The color value extraction module 404 is further configured to store the color values (such as extracted RGB values) in database 208.

By way of further non-limiting example, the color processor 204 is configured to evaluate each pixel of the image and extract RGB or tristimulus values associated with each pixel to a data object. For example, the color processor 204 is configured by the color value extraction module 404 to generate an array where each element of the array corresponds to a pixel of the image and the value associated with each element is the color value of the pixel in question. In an alternative arrangement, a user may instruct (through the use of a local or remote user interface) the color processor 204 to select a portion of the captured image and extract a color value from the selected portion. For example, one or more pixels or pixel groups are selected by a user using the color processor 204. The color values of the selected pixels are extracted, and those color values are stored as a color selection in one or more data storage location.

In one non-limiting example, the processor 204 is configured by one or more image analysis submodules to identify features of interest within the image. Here, the features identified within the image are the individual reflectance elements and/or the aperture of the color reference chart from the acquired image. Upon identification of the relevant features in the image, the processor 204 extracts color values corresponding to each reference element. As an example, the average RGB values for the area corresponding to a particular reference element are calculated and stored as the measured color value for a given location within the image. Here, the image analysis sub module evaluates the relative difference in pixel color values between each corner element and the color elements in direct contact with the corner element. In the illustration provided in FIG. 1, the two reference elements in direct contact with the corner elements have different hues. The arrangement of the elements, as determined on hue difference provides sufficient information to determine the orientation of the quadrants.

Where the color reference chart contains two or more identical color elements distributed (such as four elements in the four fold rotationally symmetric arrangement) the processor 204 can be configured to average the measured color values for the materially equivalent samples to determine an average measured color value for a specific color found in the color reference elements. By averaging the measured values for each of the elements having the same known color value, the averaged measurement is used by the processor 204 to compensate spatial inhomogeneity of the illuminant and obtain an estimation of the RGB color values for the reflectance sample as if it were placed in the center portion 106. However, other arrangements, such as selecting a preferred color reference element as representative of a specific color value are also envisioned.

In one or more particular implementations, the color processor 204 automatically selects the color at the center of the reference color chart 102 for further analysis and processing. For example, based on a pre-determined shape of the opening 106 of the color reference chart 102, one or more submodules of the color value extraction module 404 is configured to obtain the color values for each pixel within the bounds of the pre-determined shape. Here, the color values are averaged to obtain an average color sample value that can be used to identify the color.

In a further arrangement, the color values extracted according to step 304 are RGB color values. Upon extraction of the color values for the sample 104 and reference elements 103, the color values are stored in the local or remote memory 205. Using the color reference chart 102 of FIG. 1B, for each image processed by the processor 204 configured by the color extraction module 404, a data object or objects referencing the RGB reading of the sample color and the 180 different reference colors are generated.

In one particular implementation, the processor 204, configured by the color extraction module 404, transforms or manipulates the extracted color values in order to format the values for use in an artificial neural network (ANN). For example, a normalization submodule of the color value extraction module 404 normalizes the RGB values extracted to the range of [0, 1] prior to further processing. However, in other arrangements, the RGB values obtained from the images are stored in the original format or form.

As used herein, an ANN is collection of connected units or nodes (sometimes referred to as artificial neurons) receives a signal, process the received signal, and then signal additional artificial neurons connected to the active node.

In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

Figure 5:
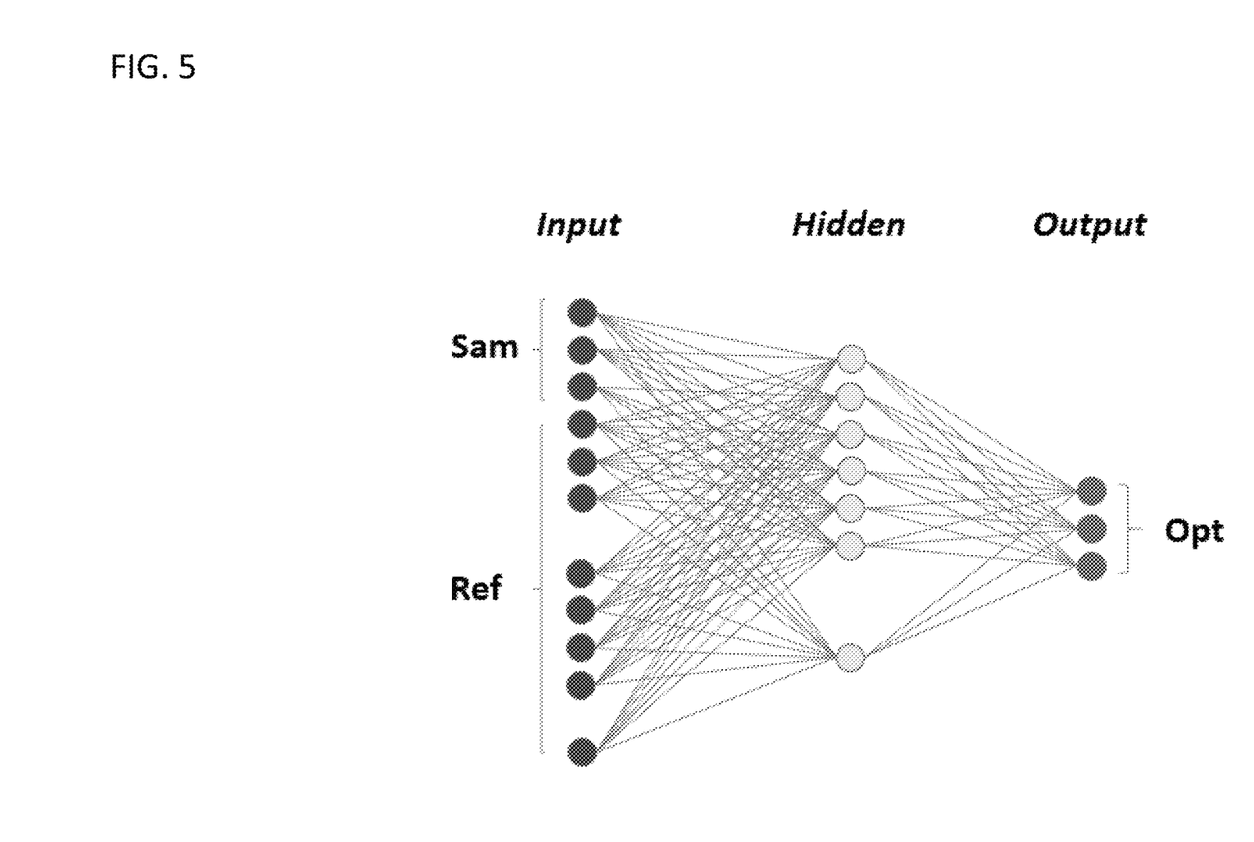
FIG. 5 presents a graph diagram detailing a representative node layer arrangement of an artificial neural network used to identify color values according to one embodiment of the present invention.

With reference to FIG. 5, the nodes of an ANN are organized into layers and are used to transform and weight input data from a source(s) (such as pixel data corresponding to an image) according to one or more algorithms. In a particular configuration, the neural network has three (3) or more layers. For example, a neural network implemented by the processor 204 has three (3) layers: an input layer, a hidden layer, and an output layer. In configurations where there are more than three (3) layers, it is typical to have two (2) or more hidden layers. With general reference to FIG. 5, the input values include both the color values of the sample 104, as well as the color values of the elements of one or more portions of the color reference chart 102 (Sam and Ref respectively). These input values are passed to the hidden layer. Here, the hidden layer comprises one or more node or units that transform the input values or vectors into hidden representations thereof. Such hidden representations include one or more offset bias values and or weight matrixes. From these hidden units, the output values are provided at the output layer. For example, where the input values are all tristimulus values, the output values will also be tristimulus values. However, in alternative configurations, where the input values convert or transform the supplied inputs to a different metric or value, the output value generated can be different.

Returning to FIG. 3, the color values extracted from the pixels corresponding to the depiction of the color reference 102 are used as inputs to one or more ANN implementations. The output of the ANN is then used to evaluate the illumination used to capture the image and match the extracted color values to the closest known illuminant color value stored in a collection of reference color databases or tables, data, objects, lists or array.

In one arrangement, each reference color database includes data indicating the CIE color values of a plurality of samples taken under a given illuminant. For example, each color reference includes color values extracted from 206 different known color samples, along with the color values extracted from the color reference chart present at the time the image was captured. In a further example, additional tables, data, objects, lists or array contain 206 entries of the same known color samples under different conditions. Each database contains the same 206 color samples, but each database represents the samples captured using different image capture devices, illuminations, or other settings. In brief, each color reference database includes the same number of entries, where those entries correspond to color values extracted from the same samples taken under different illuminants or other capture conditions. For example, images of the 206 samples and accompanying reference charts are taken at least three (3) different illuminants (D, H and S). In a further arrangement, multiple agents or image capture devices are used to capture the sample images.

In a particular implementation, each database of stored reference colors includes 206 records where each sample is a particular color offered by sample manufacturer. For instance, each sample included in the collection of a database is a color in a manufacturer or supplier's color fan deck.

As an aside, in order to ensure that the known color values are correct, a commercial spectrophotometer (Datacolor 45G®) measures the reflectance of the 206 color samples in the range of 400 nm to 700 nm with 10 nm interval. Based on the spectrophotometer measurements, CIELAB values (D65 Illumination, 10° Observer) are calculated for each color and stored as the entries for the color values of each pixel corresponding to the sample and the accompanying reference chart. In a further implementation, one or more processors is used to normalized the color values to the range of [0, 1] for ease of further processing. Those values are then used as the standard values for comparing color values to one another.

Turning to step 306, the extracted pixel color values corresponding to the reference chart portion of the image are compared against the plurality of color reference databases, tables, data, objects, lists or arrays to determine the closest match. Here, the table representing the closest match will be the color reference table obtained using the most similar illuminant. Returning to an exemplary implementation having three databases representing the same color samples captured under different illuminants, the obtained color values of the sample image are checked against the three databases (dbD, dbH or dbS) (assuming the color sequence chart provided for the entries of each database is the same used to capture the sample image).

Assuming that the color references for each database or table are the same, the extracted colors from a color reference chart of a sample can be compared to the color reference values for each entry within the database or table. For instance, the color reference comparison module 406 configures the color processor 202 to compare the color differences between the color reference chart of the sample under investigation and the stored entries in each of the color reference tables, data, objects, lists or array.

In a particular implementation, the reference-color comparison module 406 configures the color processor 204 to evaluate the color difference of the colors extracted from the image under analysis and each entry in a reference-color database. Assuming that $r_{Ai}$, $g_{Ai}$, $b_{Ai}$ are the camera rgb readings of the $i^{th}$ color in the image under analysis (A), and $r_{Bi}$, $g_{Bi}$, $b_{Bi}$ are the rgb readings of $i^{th}$ color in one entry of a given color reference table, data, objects, lists or array (B). Here, the color processor configured by the color reference comparison module 406, evaluates the color difference values according to:

$$dC = \frac{\Sigma_i (r_{Ai} - r_{Bi})^2 + (g_{Ai} - g_{Bi})^2 + (b_{Ai} - b_{Bi})^2}{3 * \Sigma_i 1}$$

Since all the reference colors in A and B are the same, the cameras used in A and B are the same, the only difference in A and B is illuminant. If B has the same illuminant as that in A, then the result dC from equation (1) will be minimum, otherwise dC will be a large value.

By minimizing dC in equation (1) across the color reference databases, tables, data, objects, lists or arrays, the color processor 204 is configured to locate the color reference database having the closest match of illuminant for A. For example, the processor is configured to iterate over each entry in each database and compare the color values of the sample reference chart to the color values of known illuminant entries of each of the databases. In a further implementation, an average score for dC is taken for each database. The database having the smallest averaged dC is determined to be the dataset or database having the closest illuminants to the illuminant used to capture the sample image.

As shown in step 308, upon determining the database or table having colors obtained using the closest illuminant to the illuminant used to capture the sample image, the identified database is selected for use in determining the closest match for the sample color in the image under analysis.

As shown in step 310, the color reference database or table of color values taken under a known illuminant closest to the illuminant used to capture the sample image is used to identify the color sample. Here, the color sample 102 is compared to each of the entries in the identified database or table to determine the entry that most closely matches the color values of the color sample.

Those possessing an ordinary level of skill in the requisite art will appreciate that there are several ways to compare the sample color 104 of the image to the entries in the selected database, list, table, array or data object. In one non-limiting implementation, the processor 102 is configured by a color search module 408 to implement a matrix transformation method to identify the color in the selected database that closest matches sample. For instance, the color processor 204 is configured to implement a matrix color transformation as provided in U.S. Pat. No. 8,634,640B2, herein incorporated by reference as if presented in its entirety.

In another example, the processor implements search of the records within the selected database using one or more neural networks, as taught in pending U.S. application Ser. No. 15/280,506 herein incorporated by reference as if presented in its entirety. In the foregoing example, a trained neural network is used to identify the color values of samples having unknown color values. Since the trained neural network utilizes nonlinear activation functions, the output can be a nonlinear transformation of the input. Practically, the trained neural network is well suited to color searching since color space is highly nonlinear and the camera image sensor responses to color space is also not strictly linear.

Specifically, the processor 204 is configured by the neural network evaluation submodule of the color search module 408 to evaluate the RGB color values of the pixels corresponding to the sample depiction in the image as well as the reference elements and output proposed CIE color values. The output CIE color values are used to search entries in the color reference database identified as the closest match. The entry of having the closest color match will be the entry matching the color value of sample.

In one or more configurations, the user is able to select a hardware or software profile prior to searching the color database using the trained neural network. For example, a graphical user interface is provided to a user indicating one or more hardware profiles (e.g. make and model of smartphone) to select from. By selecting a particular hardware profile, the processor 204 is configured to access a trained neural network specifically trained on training data tailored to the selected hardware profile. Alternatively, the processor is configured to adjust or manipulate weights within the trained neural network in response to the selection of a hardware profile.

As shown in step 312, the identified database entry is then provided as an output to the user. In another implementation, the selected entry is matched to a lookup table that corresponds to the trade name, brand name, common moniker or nomenclature of the identified color. In this arrangement, the color processor 204 configured by the output module 410 to generate an output to a user display or remote device that includes at least the color value matched. However, in one or more implementations, the output module 410 also provides a data object detailing the color value of the sample, the color values of the matched entry, the common or trade name associated with the matched color, and the manufacturer or supplier of the matched color.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A method for identifying colors within an image of a sample, the method comprising:

capturing, using an imaging device, an image of the sample and of a reference-color chart wherein the reference-color chart includes a plurality of color reference elements;

extracting from the captured image using a processor having memory configured by program code executed thereby, the RGB values of the pixels depicting the sample color and one or more of the plurality of color reference elements color values, accessing, using the processor, a plurality of known illuminant color datasets, where each of the plurality of known color datasets includes one or more color values of the color reference chart obtained under a known illuminant;

comparing, using the processor, the color values of pixels representing the reference-color chart of the captured image to the pixel values corresponding to the color reference chart elements in each entry of each of the plurality of known illuminant color datasets;

identifying, using the processor, the known illuminant color dataset having the smallest difference in color values between the color reference chart referenced in the sample image and the color values of the color reference chart referenced in the one or more entries of the one or more known illuminant color datasets;

comparing, using the processor, the color values of the pixels representing the color sample of the sample image to the color sample of each entry in the identified known illuminant color dataset;

locating, using the processor, an entry of the identified smallest distance known illuminant color dataset having the smallest difference in color values with the color sample of the sample image; and outputting the name of the identified color sample.

2. The method of claim 1, wherein outputting the name of the identified color sample includes accessing a database of color names, where each entry has an associated color value; selecting an entry in the database of color names based on the color values closest to the sample; and outputting the color name.

3. The method of claim 1, wherein the color reference chart has a plurality of identical color reference element groups, the color reference element groups arranged so as to be rotationally symmetric; each color reference group comprised of a plurality of color reference elements having a known wavelength-dependent reflectance value.

4. The method of claim 1, wherein the identifying step includes calculating the smallest difference in color values between the extracted color values of the color reference chart by obtaining the average difference in color values between each color of the color reference chart and the corresponding known color in the known color dataset.

5. The method of claim 1, wherein the identifying step includes calculating the smallest value of dC in the equation $$dC = \frac{\Sigma_i (r_{Ai} - r_{Bi})^2 + (g_{Ai} - g_{Bi})^2 + (b_{Ai} - b_{Bi})^2}{3 * \Sigma_i 1}$$

where $r_{Ai}$, $g_{Ai}$, $b_{Ai}$ are the rgb readings of ith color in the image under analysis, and $r_{Bi}$, $g_{Bi}$, $b_{Bi}$ are the rgb readings of $i^{th}$ color for a given entry in a given known color dataset.

6. The method of claim 1, wherein the locating step includes comparing the color values of the pixels corresponding to the sample to the known sample color values extracted the identified smallest distance dataset using a matrix transformation.

7. The method of claim 1, wherein the locating step includes comparing the color values of the pixels corresponding to the sample to the known sample color values extracted the identified smallest distance dataset using an artificial neural network.

8. The method of claim 1, where in the step of extracting the RGB values of the pixels depicting the sample color includes, identifying by one or more shape recognition algorithms, a shape depicted within the image that bounds an area of the image that corresponds to the sample; obtaining the pixel values for the area bound by the identified shape; and extracting one or more pixel values from the bounded area.

9. The method of claim 8, further comprising obtaining color values for at least two pixels bound by the area.

10. The method of claim 9, averaging the color values for the at least two pixels obtained and outputting the averaged value.

11. The method of claim 1, where identifying the entry having smallest color distance from the distance entry of the identified smallest distance color dataset includes providing the sample color to an artificial neural network as an input vector; receiving, as an output generated by the artificial neural network an output value; comparing the output value to one or more entries in the smallest distance color dataset.

12. A system for identifying colors within an image of a sample, the system comprising:

an image device configured to capture an image of the sample and the color reference chart;

a processor having memory configured by program code executed thereby to:

extract the RGB values of the pixel depicting the sample color values and one or more of the plurality of color reference elements reference color values, access a plurality of known illuminant color datasets, where each of the plurality of known illuminant color datasets includes one or more entries containing a nomenclature reference to a known color sample and the color values of the known color sample and a color reference chart obtained under a known illuminant;

compare the color values of pixels representing the color reference chart of the sample image to the pixel values corresponding to the color reference chart in each entry of each of the plurality of known illuminant color datasets;

identify using the processor, the known illuminant color dataset having the smallest difference in color values between the color reference chart referenced in the sample image and the color values of the color reference chart referenced in the one or more entries of the one or more known illuminant datasets and comparing the color values of the pixels representing the color sample of the sample image to the color sample of each entry in the identified color dataset;

locate, using the processor, an entry of the identified smallest distance color dataset having the smallest difference in color values with the color sample of the sample image; and output the name of the identified color sample.

13. The color identification system of claim 12, wherein color reference groups have fourfold rotational symmetry about the center portion.

14. The color identification system of claim 13, wherein each color reference element group comprises identical color reference elements.

15. The color identification system of claim 14, wherein the processor is configured to determine an average measured color value for each identical color reference element found across the one or more color reference groups.

16. The color identification system of claim 12, wherein the identifying step includes calculating the smallest value of dC in the equation $$dC = \frac{\Sigma_i (r_{Ai} - r_{Bi})^2 + (g_{Ai} - g_{Bi})^2 + (b_{Ai} - b_{Bi})^2}{3 * \Sigma_i 1}$$

where $r_{Ai}$, $g_{Ai}$, $b_{Ai}$ are the rgb readings of ith color in the image under analysis, and $r_{Bi}$, $g_{Bi}$, $b_{Bi}$ are the rgb readings of $i^{th}$ color for a given entry in a given known color dataset.

17. The color identification system of claim 12 where identifying the entry having smallest color distance from the distance entry of the identified smallest distance color dataset includes providing the sample color to an artificial neural network as an input vector; receiving, as an output generated by the artificial neural network, an output value; comparing the output value to one or more entries in the smallest distance color dataset.

18. The color identification system of claim 17, where the image processing device and processor are integrated into a single mobile computing device.

\* \* \* \* \*